(12) United States Patent
Cordoba Matilla

(10) Patent No.: US 9,000,317 B2
(45) Date of Patent: Apr. 7, 2015

(54) TOUCH-ACTIVATED DEVICE BASED ON DIELECTRIC ELASTOMERS AND METHOD OF MANUFACTURE

(75) Inventor: Jose Luis Cordoba Matilla, Madrid (ES)

(73) Assignee: Vison Tactil Portable, S.L., Madrid (ES)

( * ) Notice: Subject to any disclaimer, the term of this patent is extended or adjusted under 35 U.S.C. 154(b) by 280 days.

(21) Appl. No.: 13/808,396

(22) PCT Filed: Jul. 6, 2010

(86) PCT No.: PCT/ES2010/070464
§ 371 (c)(1), (2), (4) Date: Mar. 22, 2013

(87) PCT Pub. No.: WO2012/004421
PCT Pub. Date: Jan. 12, 2012

(65) Prior Publication Data
US 2013/0175151 A1  Jul. 11, 2013

(51) Int. Cl.
*H01H 13/14* (2006.01)
*G09B 21/00* (2006.01)
*H01H 13/85* (2006.01)
*G09B 21/02* (2006.01)

(52) U.S. Cl.
CPC .............. *G09B 21/00* (2013.01); *G09B 21/003* (2013.01); *H01H 13/85* (2013.01); *G09B 21/02* (2013.01)

(58) Field of Classification Search
USPC ................ 200/521; 340/407.1; 434/113, 114; 345/173; 715/702
IPC ............................ G09B 21/003,21/004, 21/005
See application file for complete search history.

(56) References Cited

U.S. PATENT DOCUMENTS

| | | | |
|---|---|---|---|
| 5,580,251 A | 12/1996 | Gilkes et al. | |
| 2003/0122779 A1* | 7/2003 | Martin et al. | 345/156 |
| 2003/0151597 A1* | 8/2003 | Roberts et al. | 345/173 |
| 2008/0122589 A1 | 5/2008 | Ivanov | |
| 2008/0138774 A1* | 6/2008 | Ahn et al. | 434/114 |

(Continued)

FOREIGN PATENT DOCUMENTS

ES       2 353 781       3/2011
WO    WO 2011/089274    7/2011

OTHER PUBLICATIONS

International Search Report for International Application No. PCT/ES2010/070464, mailed Feb. 22, 2011 (6 pages).

(Continued)

*Primary Examiner* — Vanessa Girardi
(74) *Attorney, Agent, or Firm* — Merchant & Gould P.C.

(57) ABSTRACT

A touch-activated device IS based on dielectric elastomers and includes a method for manufacturing same. The device includes a matrix of dielectric elastomer actuators (3) with, a matrix of upper electrodes (2) connected in rows (20); a matrix of lower electrodes (2') connected in columns (21); a layer of dielectric elastomer (1) between the matrix of upper electrodes (2) and lower electrodes (2'); a passive upper layer (8) and a passive lower layer (8') that cover the elastomer matrix (3); a printed circuit board (7) with electrical terminals (9) connected electrically to the rows (20) and columns (21) of electrodes (2,2') of the elastomer matrix (3); a matrix of actuator pins (5) partially embedded in a pin support layer (6) on the passive upper layer (8), the base of the actuator pins (5a) facing the upper electrodes (2). The device is used to generate tactile visual images.

14 Claims, 3 Drawing Sheets

(56) References Cited

U.S. PATENT DOCUMENTS

| | | |
|---|---|---|
| 2012/0242645 A1* | 9/2012 | Cordoba Matilla ........... 345/212 |
| 2013/0002570 A1* | 1/2013 | Ogg .............................. 345/173 |
| 2014/0184947 A1* | 7/2014 | Bolzmacher et al. ........... 349/12 |

OTHER PUBLICATIONS

Heydt et al. "7.5: Refreshable Braille Display Based on Electroactive Polymers." *Proc. 23rd Intl Display Research Conference*. Phoenix, AZ. (2003) pp. 15-18.

Koo et al. "Development of Soft-Actuator-Based Wearable Tactile Display." *IEEE*. vol. 24. No. 3. (2008) pp. 549-558.

Choi et al. "Tactile display as a Braille display for the visually disabled." *IEEE*. vol. 2. (2004) abstract only.

Kornbluh et al. "Electroelastomers: Applications of Dielectric Elastomer Transducers for Actuation, Generation and Smart Structures." *SPIE* vol. 4698. (2002) pp. 254-269.

Perline et al. "High-Speed Electrically Actuated Elastomers with Strain Greater than 100%" *Science*. vol. 287. (2000) pp. 836-839.

Prahlad et al. "Programmable Surface Deformation: Thickness-Mode Electroactive Polymer Actuators and Their Applications." *SPIE* vol. 5759. (2005) pp. 102-113.

\* cited by examiner

TOUCH-ACTIVATED DEVICE BASED ON DIELECTRIC ELASTOMERS AND METHOD OF MANUFACTURE

This application is a National Stage Application of PCT/ES2010/070464, filed 6 Jul. 2011 and which application is incorporated herein by reference. To the extent appropriate, a claim of priority is made to the above disclosed application.

FIELD OF THE INVENTION

The present invention relates to a technique for the manufacture of a tactile matrix optimized for the tactile transfer of information without interference between taxels (a taxel is a tactile pixel, a tactile element), having a small size, that is easily scalable in resolution (number of rows and columns), flexible and has a low production complexity.

The elastomer-based tactile matrix activated by the method and device described in international patent application no. PCT/ES2010/000019 can be applied, for example, to generate tactile visual images in a tactile visual system, such as the tactile viewing system disclosed in Spanish patent application no. 200900991.

BACKGROUND OF THE INVENTION

The technical literature describes the development and application of dielectric elastomers for mechanical actuators [1].

There are currently inventions of matrices for applications similar to Braille [3] or for use on a finger [5], where either several layers of elastomer are used to be able to obtain actuations that are intense enough to notice them, or pneumatic methods combined with elastomers, all of which is fairly complicated, expensive and difficult to industrialize. Furthermore, none of the known inventions solves the problem of both mechanical and electrical interference between taxels.

LITERATURE REFERENCES

[1] R. Pelrine, R. Kornbluh, Q. Pei, and J. Joseph, "High-Speed Electrically Actuated Elastomers with Over 100% Strain", Science, Vol. 287, No. 5454, pp. 836-839, 2000.
[2] R. Kornbluh, R. Pelrine, Q. Pei, R. Heydt, S. Stanford, S. Oh, and J. Eckerle, "Electroelastomers: Applications of Dielectric Elastomer Transducers for Actuation, Generation and Smart Structures", Smart Structures and Materials 2002: Industrial and Commercial Applications of Smart Structures Technologies, ed. A. McGowan, Proc. SPIE, Vol. 4698, pp. 254-270, 2002.
[3] R. Heydt and S. Chhokar, "Refreshable Braille Display Based on Electroactive Polymers", Proc. 23rd Intl. Display Research Conf., Phoenix, Ariz., 15-18 Sep. 2003.
[4] H. Prahlad et al., "Programmable Surface Deformation: Thickness-Mode Electroactive Polymer Actuators and their Applications", Proc. SPIE's Conference on Smart Structures and Materials, 5759, Vol. 102, 2005.
[5] Ig Mo Koo et al., "Development of Soft-Actuator-Based Wearable Tactile Display", IEEE Transactions on Robotics, Vol. 24, No. 3, June 2008

DESCRIPTION OF THE INVENTION

Based on this principle of mechanical actuation, what is presented herein is a new method for optimizing the transfer of the mechanical energy produced in the core of the dielectric elastomer to the outer point of mechanical actuation, at the same time introducing mechanical insulation between adjacent taxels. This is further done without moving mechanical parts, which would make maintenance of the device difficult and would make the manufacture thereof more expensive, being able to consider this technique suitable even for disposable devices.

This optimization in energy transfer allows reducing the area of the individual actuators in the matrix, thus achieving devices with a taxel density in tune with the density of receiving nerve endings in the skin with forces in each of the actuators making up the matrix sufficient for correctly perceiving the desired stimulus.

The matrix is directed by the selection of an element, such as the pixels for display screens or a taxel for the actuators, in the intersection of a specific row and column. Multiplexing is the term applied to the division over time whereby the pixels are excited or activated. An object of the present invention is to provide a method of manufacturing a passive matrix with a high mechanical transfer efficiency and high insulation between taxels.

A first aspect of the present invention is a touch-activated device based on dielectric elastomers comprising:
  a matrix of dielectric elastomer actuators formed by:
    a matrix of preferably circular upper electrodes connected in rows;
    a matrix of preferably circular lower electrodes facing the upper electrodes and connected in columns; and
    a layer of dielectric elastomer located between the matrix of upper electrodes and the matrix of lower electrodes;
  a passive upper and lower layer preferably made of silicone which, respectively, cover the upper and lower part of the matrix of dielectric elastomer actuators;
  a printed circuit board having a plurality of electrical terminals connected electrically to the rows and columns of electrodes of the matrix of dielectric elastomer actuators;
  a matrix of actuator pins partially embedded in a pin support layer preferably made of silicone located on the passive upper layer, the base of said actuator pins facing the upper electrodes and the head of said actuator pins projecting from the pin support layer.

In a preferred embodiment the touch-activated device comprises a matrix of lower supports, preferably semi-spherical, arranged on the printed circuit board and facing the lower electrodes, and are responsible for generating a compression of the passive lower layer in a substantially centered compression area with respect to the lower electrode.

The electrical connection of each electrical terminal of the printed circuit board with the row or column of electrodes is preferably done through a connection termination located at one end of the corresponding row or column.

The passive layers are preferably arranged drawn on the printed circuit board.

In a preferred embodiment the rows of upper electrodes and the columns of lower electrodes are arranged perpendicular.

The base and the head of the actuator pins are preferably circular, the diameter of the base being greater than the diameter of the head. The thinner the head of the pin, the more pressure it exerts on the skin (for the same actuation force of the pin, the pressure of the latter on the skin is inversely proportional to the diameter of the pin exerting the force).

Another aspect of the present invention is a method of manufacturing a touch-activated device based on dielectric elastomers. The method comprises:

Drawing a layer of dielectric elastomer (1), preferably until obtaining a thickness less than 20 or 30 µm. There is no maximum thickness, although the greater the thickness the higher the voltage needed to produce the same mechanical result. The thinner the elastomers are, the simpler the electronics used are. The thickness of the elastomer also affects the mechanical response, but since the passive layers that are used are made of very elastic materials, these passive layers are predominant in the mechanical response. Therefore, the thinner the elastomer used, the worse the mechanical result obtained is, but electrically speaking it would be more advantageous, the passive layers being those which facilitate the mechanical response.

Applying conducting paste on the upper face of the layer of dielectric elastomer to form a matrix of upper electrodes connected in rows and on the lower face to form a matrix of lower electrodes connected in columns, the assembly forming a matrix of dielectric elastomer actuators.

Depositing silicone on the part upper of the matrix of dielectric elastomer actuators to form a passive upper layer and on the lower part of the matrix of dielectric elastomer actuators to form a passive lower layer.

Covering the passive upper part with a pin support layer made of silicone and responsible for partially embedding a matrix of actuator pins the bases of which are facing the upper electrodes and the heads of which project from the pin support layer.

Arranging on the passive lower layer a printed circuit board having a plurality of electrical terminals.

Electrically connecting the electrical terminals to the rows and columns of electrodes of the matrix of dielectric elastomer actuators.

In a preferred embodiment of the method of manufacture, the actuator pins are placed on the upper electrodes prior to placing the pin support layer.

The actuator pins are preferably embedded in the pin support layer prior to placing said pin support layer on the passive upper layer.

The printed circuit board preferably has a matrix of lower supports arranged on said board such that, once the manufacturing process has ended, they are facing the lower electrodes generating a compression of the passive lower layer in a substantially centered compression area with respect to the lower electrode. This lower board can be a printed circuit board the manufacture of which includes making the circles where tin half-spheres can later be deposited in an automated manner (wave soldering or tin filler with stencils). It could also be a plastic support with the desired shape, including half-spheres and behind this plastic the printed connection circuit.

The electrical connection of each electrical terminal of the printed circuit board with the row or column of electrodes is preferably done through a connection termination located at one end of the corresponding row or column.

BRIEF DESCRIPTION OF THE DRAWINGS

A series of drawings which help to better understand the invention and which are expressly related to an embodiment of said invention, presented as a non-limiting example thereof, are briefly described below.

DESCRIPTION OF A PREFERRED EMBODIMENT OF THE INVENTION

The invention relates to a method for optimizing the transfer of mechanical energy generated by means of a dielectric elastomer.

Figure 1A:
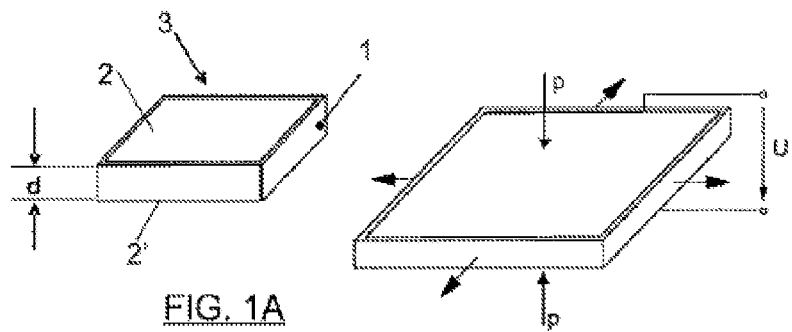
FIGS. 1A and 1B depict the operating principle of a dielectric elastomer actuator according to the existing art.
Figure 1B:
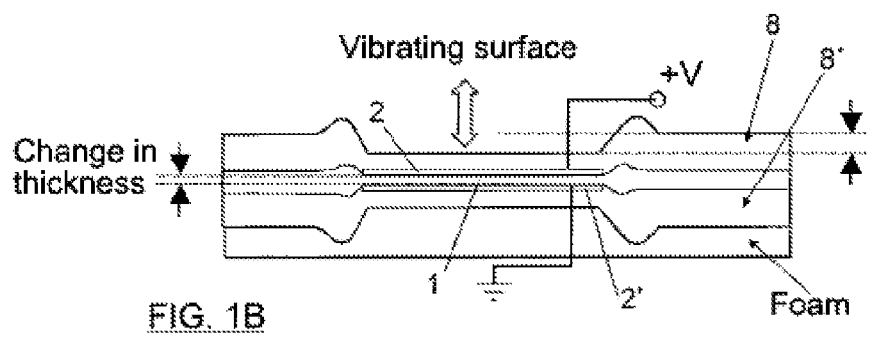

The operating principle of a dielectric elastomer actuator 3 is shown in FIGS. 1A and 1B. When a direct high voltage U is applied between both faces of a thin dielectric elastomer film 1 by means of an upper electrode 2 and a lower electrode 2', it expands in the direction of the plane due to the pressure p in the direction of the thickness induced by an electric field. When the applied voltage is removed, the elastomer film recovers the original shape. This effect can create, for example, the tactile sensations in a small area of the surface of the skin (the area of application) when the elastomer matrix is applied or fixed to a human body, preferably in a sensitive region (for example, the abdomen or the lower part of the back).

Assuming that the volume remains constant, the effective pressure is as follows:

$$p = E_r E_0 U/d$$

where $E_r$ is the relative permittivity of the elastomers, $E_0 = 8854 \cdot 10^{12}$ As/Vm is the vacuum permittivity, U is the applied voltage and d is the thickness of the elastomer film in the rest position. The pressure increases quadratically with the electric field, and it is therefore the main relationship regulating the response of the actuator. It must be pointed out that the performance of elastomer is the same regardless of the positive or negative sign of the applied voltage U.

The equivalent electric model for an elastomer element is a parallel resistor and capacitor configuration in which the capacitance is the result of two electrodes applied on the elastomer film, and the resistance is the resistance of losses generated by the conductivity of the elastomer film.

The thick mode technique is a recent embodiment of EPAM (Electroactive Polymer Artificial Muscle). In this embodiment, the "active" polymer film is coated with a thicker passive layer such that the changes in the thickness of the polymer during EPAM actuation are at least partially transferred to the passive layer. This passive layer can be considered as passive in relation to the polymer film in that it does not respond to the application of an electric field changing in area or thickness like the layer of EPAM does. However, the passive layer couples to the EPAM film such that the changes in area and thickness of the EPAM film induce shear forces in the passive layer changing the thickness of this layer. Therefore, this change in thickness of the passive layer can be used to extend in absolute terms the displacement caused by the change in thickness of the EPAM polymer film. FIG. 1A shows a schematic diagram of this type of device and of the shear mode actuation results. FIG. 1B shows EPAM during the shear mode actuation, showing a schematic diagram of a proposed shear mode device.

For tactile transmission applications, this diagram has several problems, such as the coupling between taxels through the skin itself, weak energy transmission. These problems are to be solved with the present invention while at the same time the mechanical transmission of deformations made in the elastomer is enhanced.

Figure 2A:
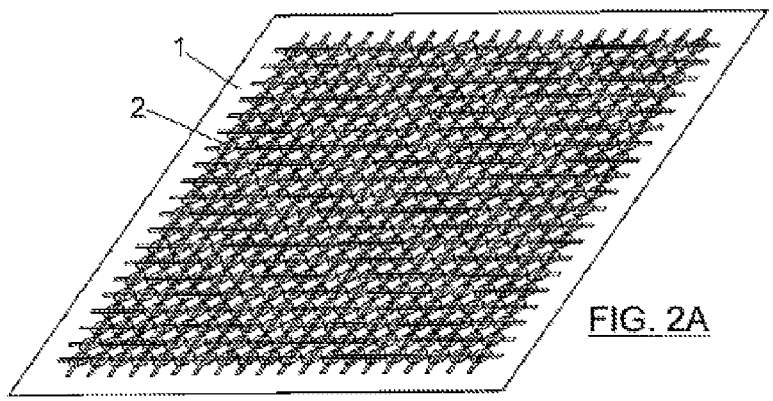
FIGS. 2A and 2B show the dielectric elastomer elements in a matrix arrangement (elastomer matrix).
Figure 2B:
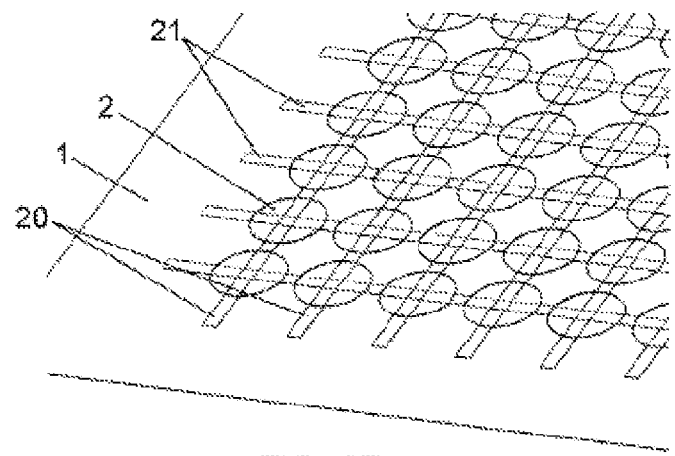

FIG. 2A shows the arrangement of the electrodes (2,2') in the dielectric elastomer 1, in an arrangement of the matrix (elastomer matrix). FIG. 2B depicts a detail of the elastomer matrix, in which it can be seen how the upper electrodes (2) are connected electrically in rows (20) and the lower electrodes (2') are connected electrically in columns (21). The drawing shows that the rows (20) and the columns (21) are perpendicular; however, this is not essential because they could be arranged forming any angle (even parallel to one another), although for easier activation of the electrodes it is advisable that they are perpendicular. The electrodes are preferably circular, as shown in FIG. 2B, but they could have other shapes (for example, square, rhomboidal, rectangular, etc.)

Figure 3A:
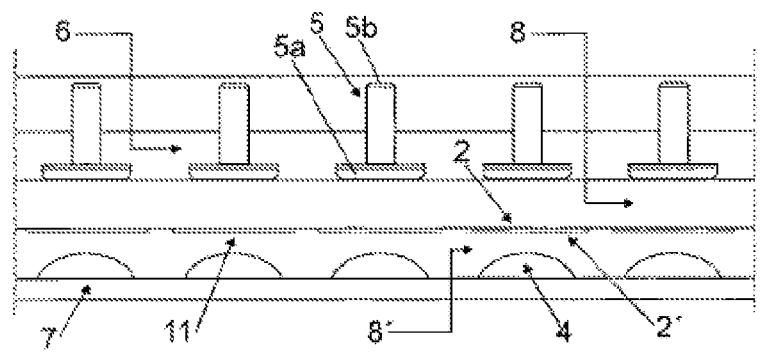
FIGS. 3A and 3B depict a 2D- and 3D-side section of the matrix of elastomer actuators, respectively.
Figure 3B:
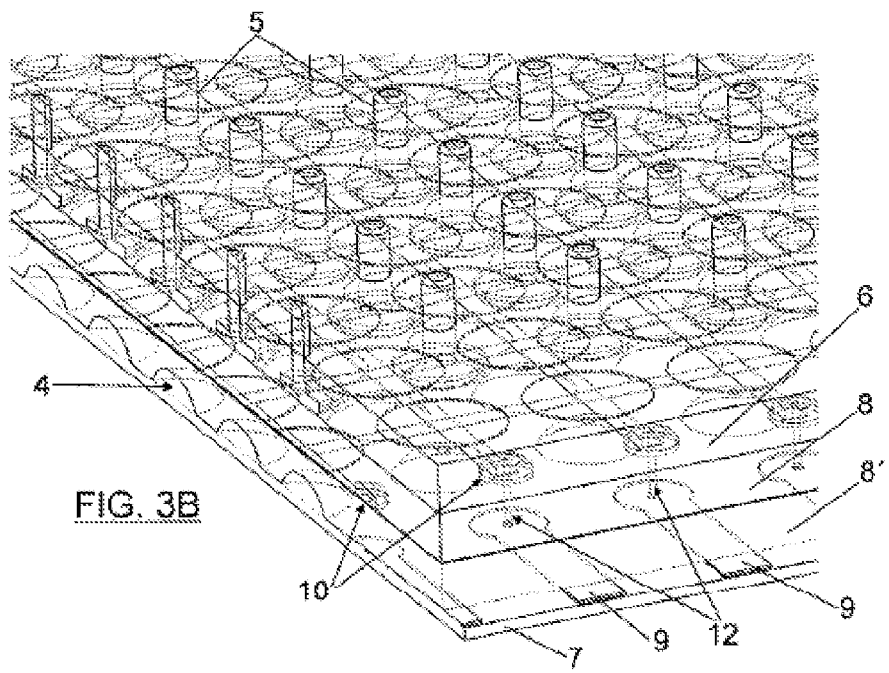
Figure 4:
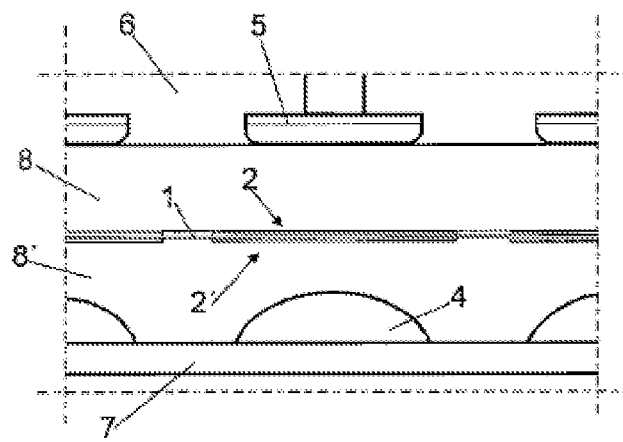
FIG. 4 shows a side section of the matrix of elastomer actuators in further detail.

The structure of the matrix of elastomer actuators is depicted in FIGS. 3A and 3B, where the different components can be seen in several layers. FIG. 3A shows a 2D-side section, whereas FIG. 3B depicts a 3D-side section. Each of the elements herein described contributes to better actuation of the taxel. Basically the incorporated elements are:

Lower support 4 with actuation concentrating functions and pre-stressing element of the passive upper layer 8 and passive lower layer 8'. The lower support 4 is preferably semi-spherical so that the stress is uniformly distributed and so that no breaks occur in the material Actuator pins 5 embedded in a pin support layer 6 for direct capture of the energy generated in the taxel by the base of the pin 5a, which is in contact with the passive upper layer 8 and for concentrating the pressure exerted at the opposite end of the pin (head of the pin 5b) with a much smaller diameter than the base, so the pressure is increased quadratically with respect to the base/head pin diameter ratio. In a preferred embodiment, a ratio of 1.8/0.6 is used, 0.6 mm being the diameter of the pin in contact with the skin and 1.8 mm being the size of the base of the pin, less than the diameter of the actuator which is 2.5 mm. All these parameters can be modified and optimized based on experimental results and simulations.

Printed circuit board 7 with support and electrical connection functions.

Pre-stressing the passive layers of the dielectric elastomer in thick mode. This can be done using several techniques, such as performing on a smaller scale or pressure stressing the lower support 4 in the board.

Starting with the lower part, there is a PCB, printed circuit board 7, serving to support and hold the remaining elements, and to support the electrical connections (electrical terminals 9) needed to actuate the matrix. This PCB 7 can be very thin, thus providing the end device with flexibility, which is appropriate for better adaptation to the body part with which it will be in contact. As seen in FIG. 3B, at the ends of the rows and columns of electrodes there is a small volume of conducting paste (connection termination 10), the same used for the electrodes, which serves to connect the elastomer matrix with the electrical terminal 9 in the PCB 7 by means of connection elements 12. The connections can therefore be made once the matrix manufacturing process has ended, which is very appropriate for simplifying said process.

On this PCB and located right under each taxel there is a lower semi-spherical support 4 the function of which is to concentrate the actuation of the taxel in the center of the latter. This semi-spherical support performs a second function, pre-stressing the passive layers (8,8') of silicone of the elastomer in thick mode, achieving with this pre-drawing a more intense actuation response because this actuation depends not only on the force that the taxel itself is capable of generating, but also on part of this force that the passive layer is capable of transmitting. As can be seen in FIG. 3A, when starting from an elastomer with a uniform passive lower layer 8', when it is placed against the base board 7 with the half-spheres under the taxels, the passive layer is compressed at certain points or areas of compression 11 centered under the taxel, which is the equivalent to drawing the silicone over the half-sphere producing a stress in the stand-by state which helps to improve the intensity and quickness of the mechanical response of the taxel. Other pre-drawing methods can be the preparation of the matrix on a smaller scale in order to adhere it to the base board on an original scale by means of drawing. The lower half-spheres 4 help in channeling and concentrating the energy at the central tip of the pin.

The other part of the enhancing device, formed by an embedded pin 5, is located in the upper part of the elastomer. The head of the pin must be close enough to the center of actuation so that it captures most of the generated energy. This pin 5 captures and channels the energy from the actuator to take it to the outer end in contact with the skin. To minimize the mechanical components and simplify the matrix manufacturing process, these pins are held by an additional layer of silicone, pin support layer 6, keeping them in contact with the passive upper layer 8 of the elastomer at all times. The proportions between the diameter of the electrodes (2,2') of the actuator, the thickness of the passive upper layer 8 (distance from the pin 5 to the actuator) and passive lower layer 8' and the height of the semi-spherical lower support 4 will determine the taxel response performance parameters, having to find a compromise according to the parameter to be optimized, such as vertical displacement, actuation force, response time, etc.

Although the deformation in the passive layer of silicone in an actuator in thick mode is greater the thicker this layer is for approaches where the diameter of the actuator is much greater than the thickness of the layer, it is also true that the energy expands spherically inside the silicone core (elastomer combination in thick mode) such that the energy per unit surface area is less upon moving away from the center of actuation (in cubic proportion), hence the compromise between thickness of the passive layer on which the head of the pin rests to obtain optimal actuation results in the pin for the energy captured by the latter.

Since the taxel actuator is comprised between the lower support 4, held to the common support board 7 and the pin 5 itself, the entire mechanical actuation is transferred to the actuator pin 5.

The ratio between the thicknesses of the passive layers (8,8') affects the actuation properties of the pin and of the insulation between adjacent pins 5. On one hand, the greater the thickness the greater the vertical displacement in a model where the diameter of the pin 5 is much greater than the thickness of the passive layer 8. As the diameter is comparable to the thickness of the passive layer this vertical displacement decreases due to the deformation of the total volume of the passive layer.

In a preferred embodiment actuator diameters of about 2.5 mm are used to allow a distance of 3 mm between actuators, the passive lower layer 8' is 1 mm thick, the passive upper layer 8 on which the pin 5 rests is 0.5 mm thick, and the pin support layer 6 is 0.5 to 0.7 mm thick. The diameter of the head of the pin is 1.8 mm and the diameter of the tip is 0.6 mm. However, different measurements could be used.

The process of manufacturing the device begins with drawing the elastomer until it is 20 um thick, applying the electrodes (2,2') by means of a mask and depositing conducting paste. The silicone is then deposited to form the two passive layers, the 1 mm thick passive lower layer 8' and the 0.5 mm thick passive upper layer.

At this point the PCB is connected to each of the terminations in the elastomer by means of inserting a thin conductor wire, the connection element 12, (of the order of 0.1 mm in diameter) (perpendicularly passing through the passive layers and the elastomer at the point of connection prepared for it (connection termination 10), also passing through the hole in the PCB existing in each electrical terminal (9). The wire will be soldered in the rear part of the PCB and cut right above the passive layer (8) such that when the pin support layer 6 is added, the connections are covered and electrically insulated.

Then the pins 5 are placed on each of the upper electrodes 2 and the pin support layer 6 is covered with the final 0.5 to 0.7 mm thick layer of silicone.

This last step can also be performed separately, manufacturing a mat 0.5 to 0.7 mm thick with the pins embedded therein to then adhere this mat on the rest of the matrix-actuator, simplifying the manufacturing process.

Although they are described as two layers in the manufacturing process, once the pin support layer 6 and the passive upper layer 8 are finished they are melted and form a single layer with the pins 5 embedded therein.

In the manufacturing process the layer of dielectric elastomer (1) is always drawn. Furthermore and optionally, the passive layers (8,8') can be drawn to improve the transmission of pressure.

The invention claimed is:

1. A touch-activated device based on dielectric elastomers, comprising:
   a matrix of dielectric elastomer actuators formed by:
      a matrix of upper electrodes connected in rows;
      a matrix of lower electrodes facing the upper electrodes and connected in columns; and
      a layer of dielectric elastomer located between the matrix of upper electrodes and the matrix of lower electrodes;
   a passive upper layer and passive lower layer which respectively cover a upper part and a lower part of the matrix of dielectric elastomer actuators;
   a printed circuit board having a plurality of electrical terminals connected electrically to the rows and columns of electrodes of the matrix of dielectric elastomer actuators;
   a matrix of actuator pins partially embedded in a pin support layer located on the passive upper layer, a base of said actuator pins (5*a*) facing the upper electrodes and a head of said actuator pins (5*b*) projecting from the pin support layer and
   a matrix of lower supports arranged on the printed circuit board and facing the lower electrodes, and generating compression of the passive lower layer in a substantially centered compression area with respect to the lower electrode.

2. The touch-activated device according to claim 1, wherein the lower supports are semi-spherical.

3. The touch-activated device according to claim 1, wherein an electrical connection of each electrical terminal of the printed circuit board with the row or column of electrodes is made through a connection termination located at one end of the corresponding row or column.

4. The touch-activated device according to claim 1, wherein the passive layers are arranged drawn on the printed circuit board.

5. The touch-activated device according to claim 1, wherein the electrodes are circular.

6. The touch-activated device according to claim 1, wherein the pin support layer is made of silicone.

7. The touch-activated device according to claim 1, wherein the passive layers are made of silicone.

8. The touch-activated device according to claim 1, wherein the rows of upper electrodes and the columns of lower electrodes are arranged perpendicular.

9. The touch-activated device according to claim 1, wherein the base and the head of the actuator pins are circular, the diameter of the base being greater than the diameter of the head.

10. A method of manufacturing a touch-activated device based on dielectric elastomers, comprising:
    drawing a layer of dielectric elastomer (4);
    applying conducting paste on an upper face of the layer of dielectric elastomer to form a matrix of upper electrodes connected in rows and on the a lower face to form a matrix of lower electrodes connected in columns, forming a matrix of dielectric elastomer actuators;
    depositing silicone on the an upper part of the matrix of dielectric elastomer actuators to form a passive upper layer and on a lower part of the matrix of dielectric elastomer actuators to form a passive lower layer;
    covering the passive upper layer with a pin support layer made of silicone and responsible for partially embedding a matrix of actuator pins having bases which face the upper electrodes and heads which project from the pin support layer;
    arranging on the passive lower layer a printed circuit board having a plurality of electrical terminals;
    electrically connecting the electrical terminals to the rows and columns of electrodes of the matrix of dielectric elastomer actuators.

11. The method of manufacture according to claim 10, where the actuator pins are placed on the upper electrodes prior to placing the pin support layer.

12. The method of manufacture according to claim 10, where the actuator pins are embedded in the pin support layer prior to placing said pin support layer on the passive upper layer.

13. The method of manufacture according to claim 10, wherein the printed circuit board has a matrix of lower supports arranged on said board such that once the manufacturing process has ended they are facing the lower supports face the lower electrodes, generating a compression of the passive lower layer in a substantially centered compression area with respect to the lower electrode.

14. The method of manufacture according to claim 10, wherein and electrical connection of each electrical terminal of the printed circuit board to the row or column of electrodes is done through a connection termination located at one end of the corresponding row or column.

\* \* \* \* \*